(12) United States Patent
Tagami et al.

(10) Patent No.: US 8,773,797 B2
(45) Date of Patent: Jul. 8, 2014

(54) INFORMATION RECORDING APPARATUS AND INFORMATION WRITING METHOD

(75) Inventors: Naoki Tagami, Tokyo (JP); Kazuto Kashiwagi, Tokyo (JP); Takayuki Kawabe, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 135 days.

(21) Appl. No.: 13/443,025

(22) Filed: Apr. 10, 2012

(65) Prior Publication Data

US 2013/0182349 A1    Jul. 18, 2013

(30) Foreign Application Priority Data

Jan. 13, 2012   (JP) .................................. 2012-005517

(51) Int. Cl.
*G11B 20/16*   (2006.01)
(52) U.S. Cl.
USPC ............................................................ 360/51
(58) Field of Classification Search
None
See application file for complete search history.

(56) References Cited

U.S. PATENT DOCUMENTS

| | | | | |
|---|---|---|---|---|
| 5,629,912 A * | 5/1997 | Okawa et al. | ............... | 369/44.29 |
| 5,675,586 A * | 10/1997 | Sako et al. | ..................... | 714/701 |
| 6,331,969 B1 * | 12/2001 | Kobayashi et al. | ......... | 369/275.3 |
| 6,735,160 B1 * | 5/2004 | Miyashita et al. | ......... | 369/59.12 |
| 8,147,995 B2 * | 4/2012 | Xi et al. | .......................... | 428/828 |
| 2002/0126601 A1 * | 9/2002 | Liew | ........................... | 369/47.51 |
| 2003/0185128 A1 * | 10/2003 | Shoji et al. | ................. | 369/59.25 |
| 2003/0189884 A1 * | 10/2003 | Yumiba et al. | ............. | 369/47.28 |
| 2004/0001414 A1 * | 1/2004 | Kadowaki et al. | ......... | 369/59.24 |
| 2004/0246866 A1 * | 12/2004 | Sato et al. | ................... | 369/59.25 |
| 2005/0174915 A1 * | 8/2005 | Nagai et al. | ................. | 369/59.25 |
| 2006/0031868 A1 * | 2/2006 | Yamaoka et al. | ............. | 720/718 |
| 2006/0039262 A1 * | 2/2006 | Nagai et al. | ................. | 369/59.25 |
| 2006/0066981 A1 * | 3/2006 | Brenden et al. | ................. | 360/75 |
| 2009/0196140 A1 * | 8/2009 | Yamaoka et al. | ............. | 369/100 |
| 2010/0055503 A1 * | 3/2010 | Shimatsu et al. | ........... | 428/836.1 |
| 2010/0238586 A1 * | 9/2010 | Suzuki | ............................ | 360/75 |
| 2011/0199867 A1 * | 8/2011 | Stipe | .......................... | 369/13.24 |
| 2011/0299371 A1 * | 12/2011 | Nakasendo et al. | ........ | 369/44.11 |
| 2012/0230169 A1 * | 9/2012 | Shimazawa et al. | ........ | 369/13.33 |
| 2013/0182349 A1 * | 7/2013 | Tagami et al. | ................... | 360/51 |

FOREIGN PATENT DOCUMENTS

| | | |
|---|---|---|
| JP | 04-067419 | 3/1992 |
| JP | 3082715 | 6/2000 |
| JP | 2011-028822 | 2/2011 |

* cited by examiner

*Primary Examiner* — Peter Vincent Agustin
(74) *Attorney, Agent, or Firm* — Patterson & Sheridan, LLP

(57) ABSTRACT

According to one embodiment, there is provided an information recording apparatus that writes information onto a magnetic recording medium including a plurality of fine magnetic grains. The information recording apparatus includes a random number generation unit, a modulation unit, and a processing unit. The random number generation unit generates a random number bit value. The modulation unit modulates a period of a basic clock according to the random number bit value generated, and generates a modulated clock. The processing unit writes or reads information with respect to the magnetic recording medium in synchronization with the modulated clock generated.

20 Claims, 15 Drawing Sheets

5

2 GRAINS/1 BIT    2 GRAINS/1 BIT

905

1 GRAIN/1 BIT   1 GRAIN/1 BIT

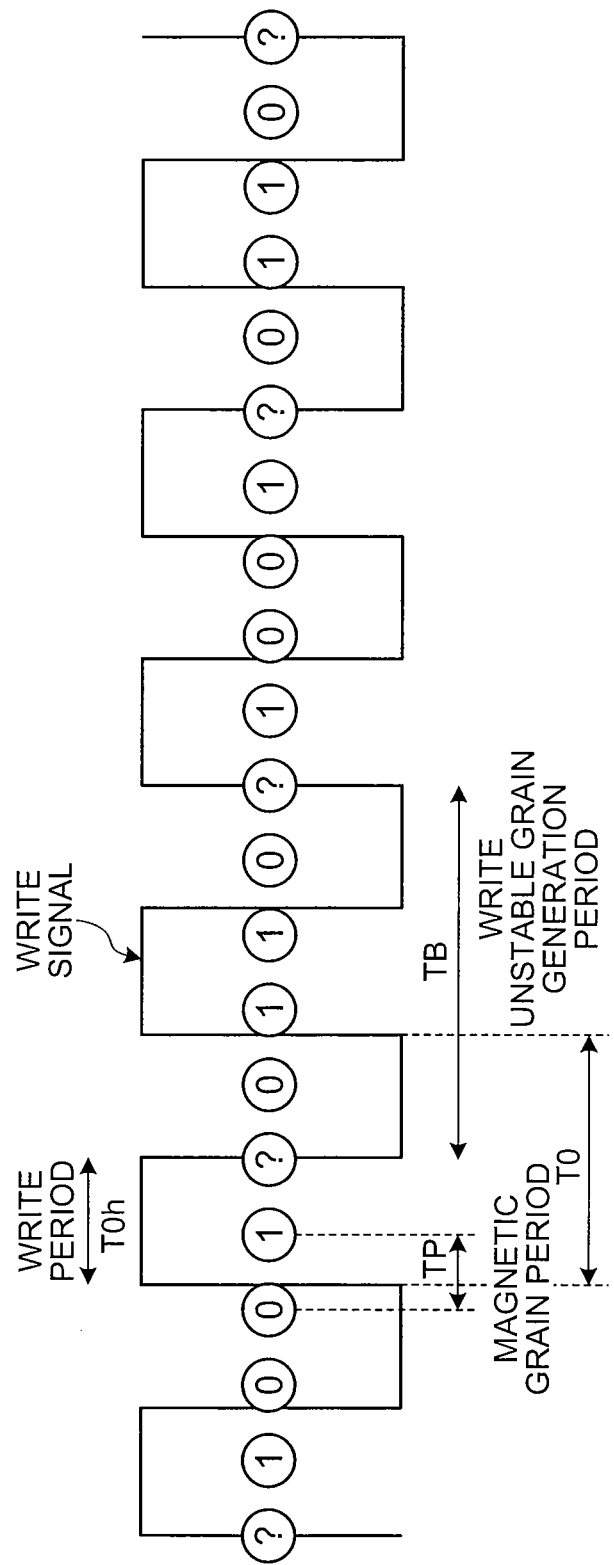

NUMBER OF GRAIN IN 1 BIT

DISPERSION OF MAGNETIC GRAIN

INFORMATION RECORDING APPARATUS AND INFORMATION WRITING METHOD

CROSS-REFERENCE TO RELATED APPLICATIONS

This application is based upon and claims the benefit of priority from Japanese Patent Application No. 2012-005517, filed on Jan. 13, 2012; the entire contents of which are incorporated herein by reference.

FIELD

Embodiments described herein relate generally to an information recording apparatus and an information writing method.

BACKGROUND

In recent years, with an improvement in areal recording density of magnetic recording media to meet a demand for increase in recording capacity of hard disk drives (HDDs), the size of each writing bit on the magnetic recording media has become extremely small, i.e., about several 10 nm. Even when each writing bit has such an extremely small size, there is a demand for improvement in an S/N ratio while reducing a ratio of noise components contained in a read signal upon reading of information written on the magnetic recording media.

BRIEF DESCRIPTION OF THE DRAWINGS

FIG. 13 is a diagram showing a comparative example;

DETAILED DESCRIPTION

In general, according to one embodiment, there is provided an information recording apparatus that writes information onto a magnetic recording medium including a plurality of fine magnetic grains. The information recording apparatus includes a random number generation unit, a modulation unit, and a processing unit. The random number generation unit generates a random number bit value. The modulation unit modulates a period of a basic clock according to the random number bit value generated, and generates a modulated clock. The processing unit writes or reads information with respect to the magnetic recording medium in synchronization with the modulated clock generated.

Exemplary embodiments of an information recording apparatus and an information writing method will be explained below in detail with reference to the accompanying drawings. The present invention is not limited to the following embodiments.

First Embodiment

Figure 1:
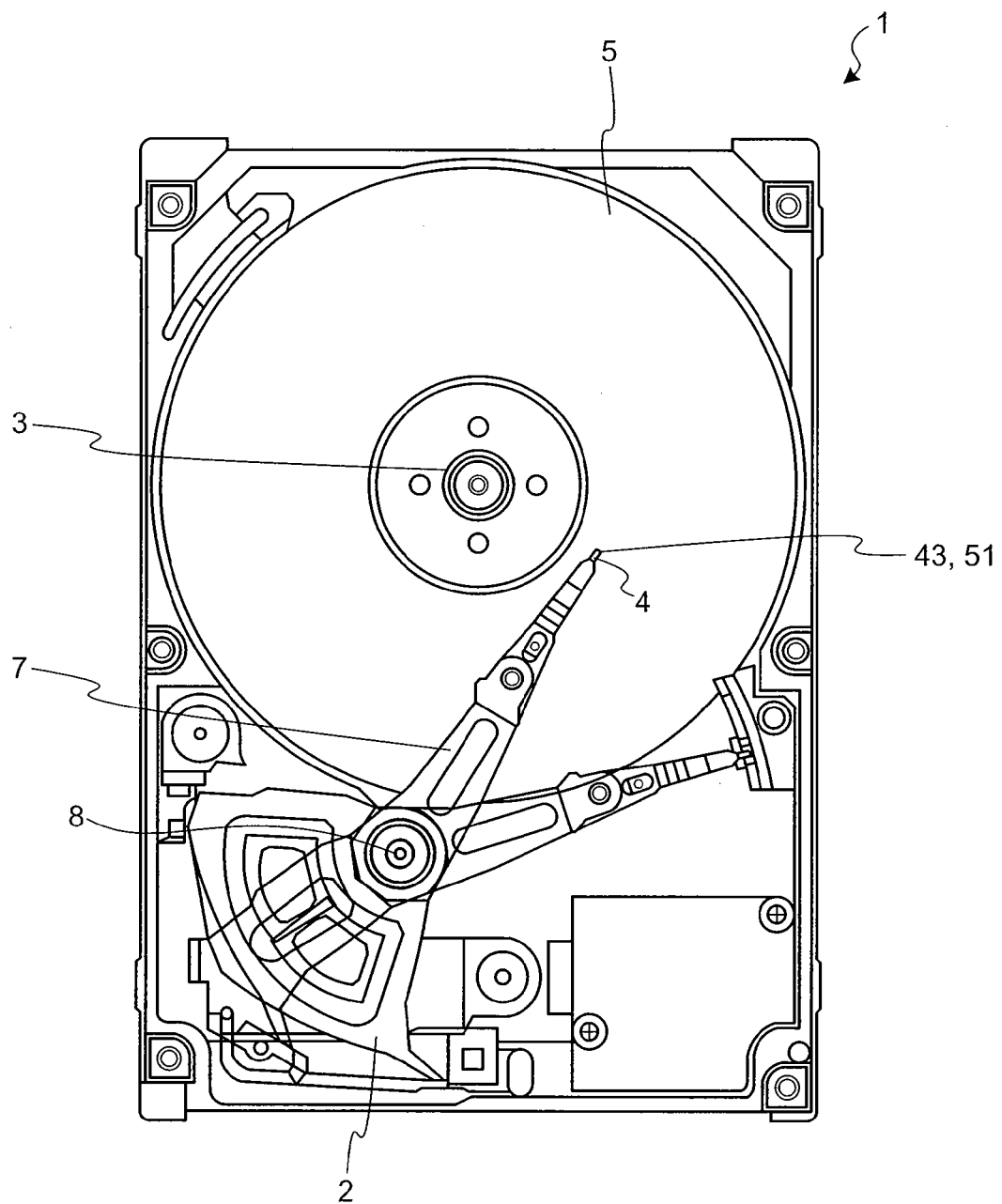
FIG. 1 is a diagram showing a schematic configuration of an information recording apparatus according to a first embodiment.

First, an outline of an information recording apparatus 1 according to a first embodiment will be described. FIG. 1 is a diagram showing a configuration of the information recording apparatus 1 according to the first embodiment. Referring to FIG. 1, a magnetic recording medium 5 is a disc-like recording medium for writing various types of information and is rotationally driven by a spindle motor 3. The magnetic recording medium 5 includes a recording layer (see FIG. 2A) having a plurality of magnetic grains as described later.

A magnetic writing head 43 and a magnetic reading head 51, which are provided at one end of an arm 7 serving as a head support mechanism, read and write information with respect to the magnetic recording medium 5. The magnetic writing head 43 writes information onto the magnetic recording medium 5, while maintaining a slightly floating state from a surface of the magnetic recording medium 5 by a lift generated by the rotation of the magnetic recording medium 5. The magnetic reading head 51 reads the information written on the magnetic recording medium 5, while maintaining the slightly floating state from the surface of the magnetic recording medium 5 by the lift generated by the rotation of the magnetic recording medium 5. The arm 7 rotates along a circular arc about an axis 8 by a driving force of a voice coil motor 2 serving as a head drive mechanism provided at the other end of the arm 7. The magnetic writing head 43 and the magnetic reading head 51 moves to seek in the track transverse direction of the magnetic recording medium 5, and change a track to be read or written.

A typical magnetic recording medium includes a plurality of magnetic grains in which information is to be written by the information recording apparatus 1. The magnetic grains have a predetermined (for example, a certain amount of) disversion in position and size thereof due to production processes. For this reason, there is a possibility of achieving a reduction in bit error due to the disversion in position and size of the magnetic grains by expressing 1-bit information using magnetization of the magnetic grains. However, with the recent improvement in areal recording density of magnetic recording media to meet the demand for increase in recording capacity of hard disk drives (HDDs), each writing bit on the magnetic recording media has an extremely small size of about several 10 nm.

Figure 14:
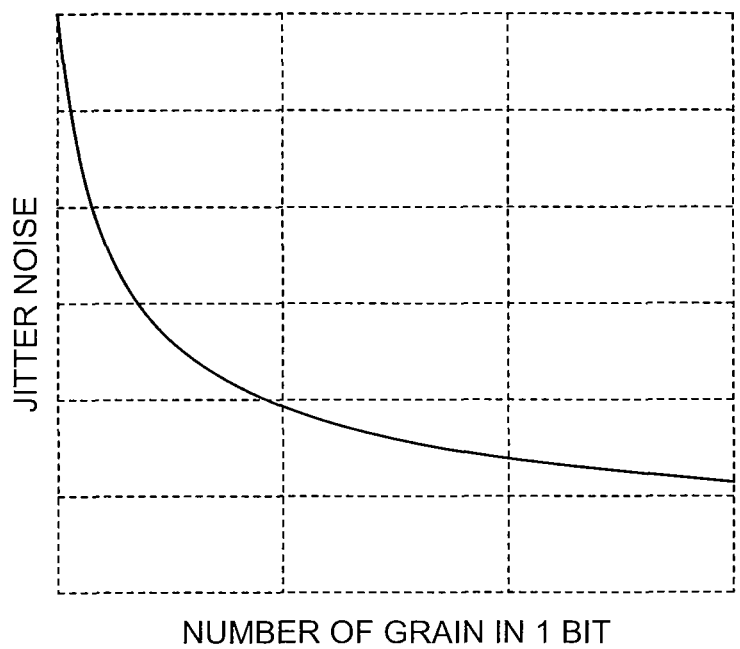
FIG. 14 is a diagram showing a comparative example.

In the case where each writing bit size has been reduced, the number of the magnetic grains in which 1-bit information is to be written tends to decrease. In this case, as shown in FIG. 14, the number of the magnetic grains contained in one bit decreases along with a higher density, and jitter noise tends to increase.

Figure 2A:
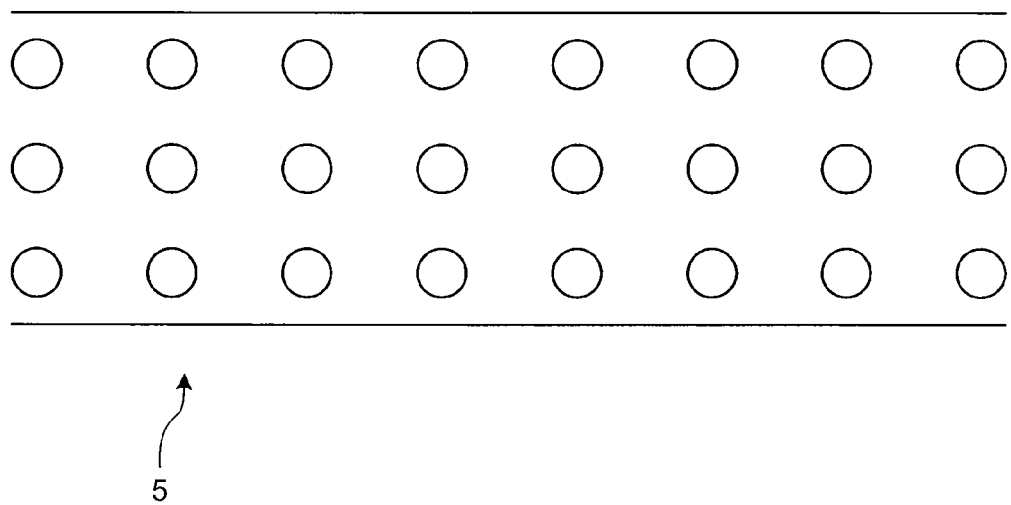
FIGS. 2A and 2B are diagrams each showing a configuration of a magnetic recording medium according to the first embodiment.
Figure 2B:
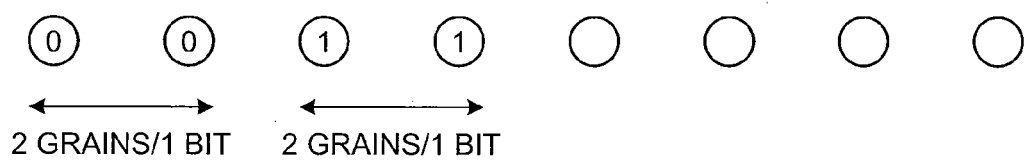

On the other hand, in the magnetic recording medium 5 according to the present embodiment, a plurality of magnetic grains are regularly (for example, evenly) aligned as shown in FIG. 2A, and each 1-bit information is written in two or more magnetic grains among the plurality of the magnetic grains as shown in FIG. 2B. In other words, the magnetic recording medium 5 according to the present embodiment enables reduction in disversion in position and size of the magnetic grains as compared with magnetic recording media of a related art, which contributes to reduction in jitter noise. The magnetic recording medium 5 as described above is called an ordered medium, for example, because a plurality of magnetic grains are regularly aligned therein, and is also called a nano-particle medium.

Figure 15:
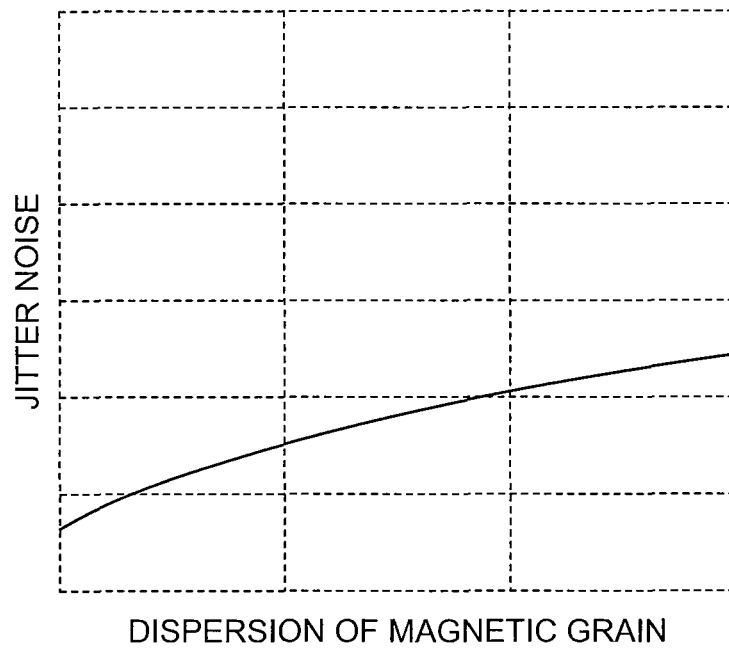
FIG. 15 is a diagram showing a comparative example.

The magnetic recording medium 5 according to the present embodiment enables reduction in disversion of the magnetic grains, which contributes to reduction in jitter noise even when the number of the magnetic grains contained in one bit is the same, as shown in FIG. 15.

Figure 16:
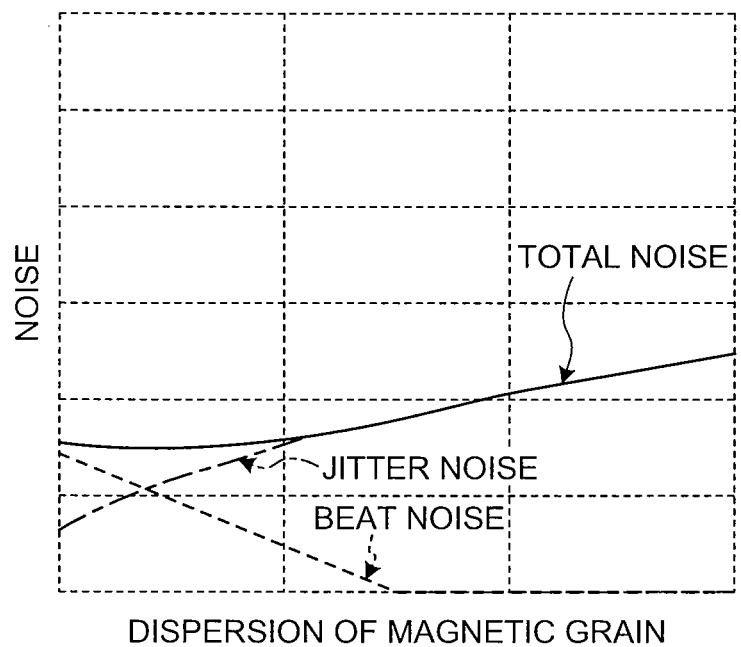
FIG. 16 is a diagram showing a comparative example.

However, as shown in FIGS. 2A and 2B, when a plurality of magnetic grains are regularly (for example, evenly) aligned, a write signal inversion timing matches the position of a magnetic grain with a period (hereinafter referred to as "beat period TB") corresponding to the least common multiple of a high-level period T0$h$ corresponding to a period T0 of a write basic clock CKf (for example, T0$h$≈T0/2) and a space period TP of the magnetic grain in the reading direction as shown in FIG. 13. As a result, magnetic grains magnetization direction of which becomes unstable (hereinafter referred to as "recording unstable grains") are generated. In this case, as shown in FIG. 16, beat noise generated with a beat period due to jitter noise is predominant as a noise component. In order to reduce the total noise, a technique for suppressing generation of the recording unstable grains is required.

As one method for reducing the recording unstable grains, it is possible to employ a method in which a write phase is controlled with respect to a period of magnetic grains in the magnetic recording medium 5 and synchronous writing is performed such that a magnetic field of writing head for determining the magnetization direction of the magnetic grains is applied with precision.

To achieve the synchronous writing, however, it is necessary to completely recognize the period and phase of the magnetic grains in the magnetic recording medium 5 during application of the magnetic field of writing head. This may lead to an increase in cost and make it difficult to implement the synchronous writing.

In view of the above, in the present embodiment, the amount of total noise is reduced by reducing the number of recording unstable grains generated with a beat period to improve the S/N ratio also in the asynchronous writing. Therefore, a method is proposed in which modulation is first performed by adding an intentional fluctuation to the period of the basic clock for writing and desired information is written using the modulated clock which is the modulated write signal.

Figure 3:
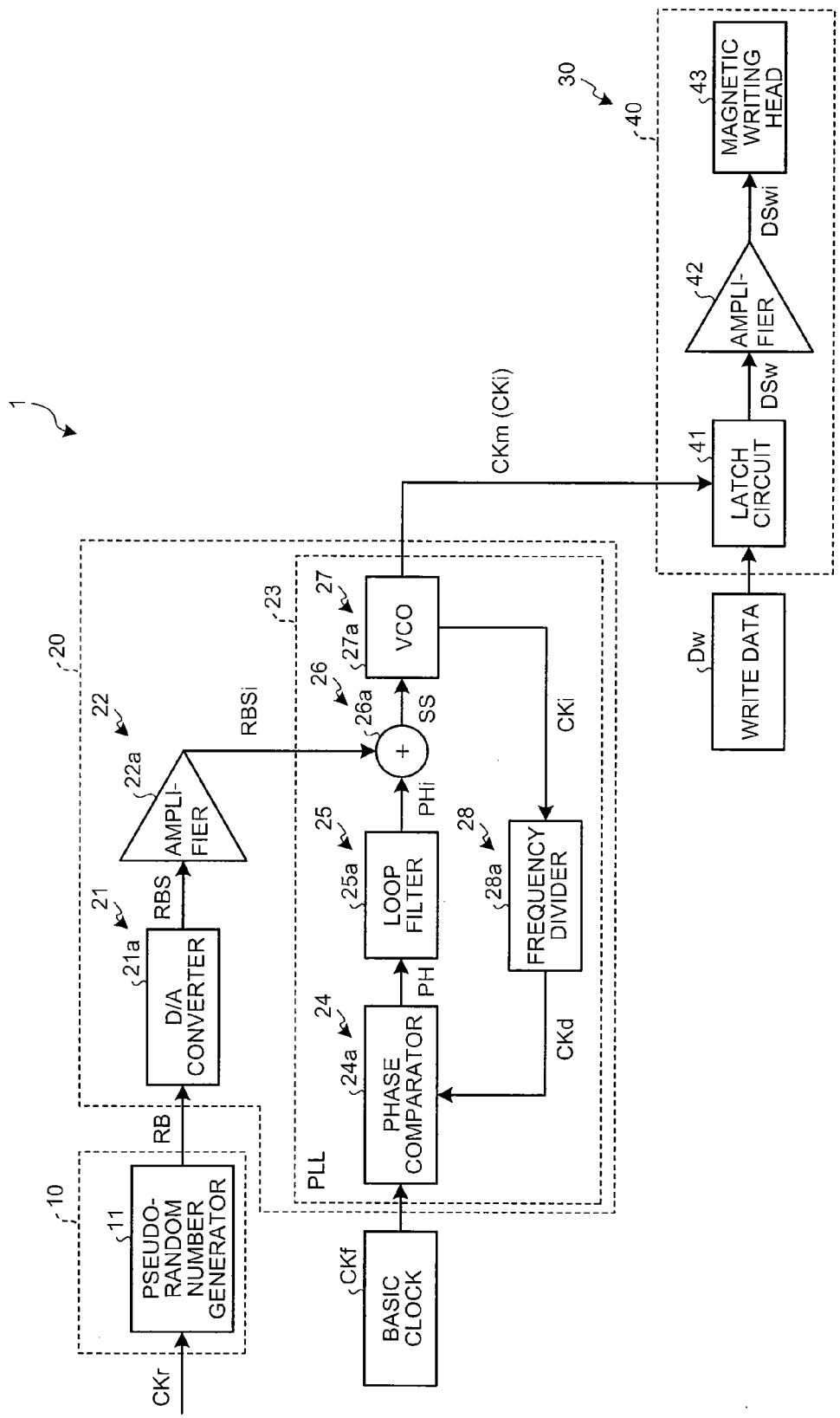
FIG. 3 is a diagram showing a configuration associated with writing of the information recording apparatus according to the first embodiment.

Specifically, as shown in FIG. 3, the information recording apparatus 1 includes a random number generation unit 10, a modulation unit 20, and a processing unit 30.

The random number generation unit 10 generates a random number bit value RB. For example, the random number generation unit 10 includes a pseudo-random number generator 11. In the pseudo-random number generator 11, a pseudo-random number table including predetermined pseudo-random number series, for example, is set in advance as a pseudo-random number seed. The predetermined pseudo-random number series are preliminarily adjusted to be unrelated to information series to be written on the magnetic recording medium 5. The pseudo-random number generator 11 receives a random number generation clock CKr, and generates the random number bit value RB in synchronization with the random number generation clock CKr. The pseudo-random number generator 11 supplies the generated random number bit value RB to the modulation unit 20.

The modulation unit 20 receives the random number bit value RB from the random number generation unit 10. The modulation unit 20 modulates the period of the basic clock CKf according to the random number bit value RB generated by the random number generation unit 10, thereby generating a modulated clock CKm. For example, the modulation unit 20 includes a D/A conversion unit 21, an amplification unit 22, and a PLL (Phase Locked Loop) circuit 23.

The D/A conversion unit 21 receives the random number bit value RB from the random number generation unit 10. The D/A conversion unit 21 includes a D/A converter 21$a$, for example, and performs D/A conversion on the random number bit value RB (digital signal) generated by the random number generation unit 10 by using the D/A converter 21$a$, thereby generating a random number signal RBS (analog signal). The D/A conversion unit 21 supplies the random number signal RBS to the amplification unit 22.

The amplification unit 22 receives the random number signal RBS from the D/A conversion unit 21. The amplification unit 22 includes an amplifier 22$a$, for example, and amplifies the random number signal RBS, which is generated by the D/A conversion unit 21, by using the amplifier 22$a$. At this time, the amplification unit 22 performs amplification with a gain preliminarily determined so that a noise component contained in the read signal becomes an appropriate level (see FIGS. 7A and 7B), as described later. The amplification unit 22 supplies an amplified random number signal RBSi to the PLL circuit 23.

The PLL circuit 23 receives the basic clock CKf from the outside (for example, a clock generation circuit which is not shown) and also receives the amplified random number signal RBSi from the amplification unit 22. The PLL circuit 23 generates the modulated clock CKm by modulating the period of the basic clock CKf according to the random number signal RBSi amplified by the amplification unit 22. For example, the PLL circuit 23 includes a phase comparison unit 24, a filter unit 25, a synthesizing unit 26, an oscillation unit 27, and a frequency division unit 28.

The phase comparison unit 24 receives the basic clock CKf from the outside and also receives a frequency-divided clock CKd from the frequency division unit 28. The phase comparison unit 24 includes a phase comparator 24$a$, for example. The phase comparison unit 24 compares the phase of the basic clock CKf with the phase of the frequency-divided clock CKd by using the phase comparator 24$a$, and outputs a phase error signal PH according to the comparison result to the filter unit 25.

The filter unit 25 receives the phase error signal PH from the phase comparison unit 24. The filter unit 25 includes a loop filter 25$a$, for example, and reduces error components contained in the phase error signal PH by using the loop filter 25a. The filter unit 25 supplies a phase error signal PHi in which the error components are reduced to the synthesizing unit 26.

The synthesizing unit 26 receives the phase error signal PHi from the filter unit 25 and also receives the random number signal RBSi from the amplification unit 22. The synthesizing unit 26 synthesizes the phase error signal PHi with the random number signal RBSi to generate a synthesized signal SS. The synthesizing unit 26 includes an adder 26a, for example, and adds the phase error signal PHi and the random number signal RBSi by using the adder 26a, and outputs the addition result to the oscillation unit 27 as the synthesized signal SS.

The oscillation unit 27 receives the synthesized signal SS from the synthesizing unit 26. The oscillation unit 27 includes a voltage control oscillator (VCO) 27a, for example, and oscillates at a frequency according to the synthesized signal SS by using the voltage control oscillator 27a, thereby generating an internal clock CKi. The oscillation unit 27 outputs the internal clock CKi to the processing unit 30 as the modulated clock CKm, and supplies the internal clock CKi to the frequency division unit 28.

The frequency division unit 28 receives the internal clock CKi from the oscillation unit 27. The frequency division unit 28 includes a frequency divider 28a, for example, and divides the frequency of the internal clock CKi by using the frequency divider 28a, thereby generating a frequency-divided clock CKd. The frequency division unit 28 supplies the frequency-divided clock CKd to the phase comparison unit 24.

In this manner, the PLL circuit 23 modulates the period of the basic clock CKf according to the random number signal RBSi, and generates the modulated clock CKm to be output to the processing unit 30.

The processing unit 30 receives the modulated clock CKm from the modulation unit 20. The processing unit 30 writes or reads information with respect to the magnetic recording medium 5 (see FIG. 1) in synchronization with the generated modulated clock CKm. For example, the processing unit 30 includes a writing unit 40 and a reading unit 50 (see FIG. 5). The reading unit 50 will be described later.

The writing unit 40 receives the modulated clock CKm from the oscillation unit 27 of the PLL circuit 23 and also receives write data Dw from the outside (for example, a controller which is not shown). The writing unit 40 writes information corresponding to the write data Dw onto the magnetic recording medium 5 by using the modulated clock CKm. For example, the writing unit 40 includes a latch circuit 41, an amplifier 42, and a magnetic writing head 43 (see FIG. 1).

The latch circuit 41 receives the modulated clock CKm from the oscillation unit 27 of the PLL circuit 23 and also receives the write data Dw from the outside. The latch circuit 41 retrieves and holds the write data Dw in synchronization with the modulated clock CKm. At the same time, the latch circuit 41 performs D/A conversion on the held write data Dw (digital signal) in synchronization with the modulated clock CKm, thereby generating a write signal DSw (analog signal). The latch circuit 41 supplies the write signal DSw to the amplifier 42.

The amplifier 42 receives the write signal DSw from the latch circuit 41. The amplifier 42 amplifies the write signal DSw to a current signal DSwi, and supplies the amplified signal to the magnetic writing head 43.

The magnetic writing head 43 generates a magnetic field according to the current signal DSwi, and writes information corresponding to the write data Dw onto the magnetic recording medium 5.

At this time, the timing of conversion into the write signal, that is, the period of generating the magnetic field of writing head, depends on the period of the modulated clock CKm to be input to the latch circuit 41. The modulated clock CKm is generated in such a manner that the period of the basic clock CKf is modulated in the modulation unit 20. In the present embodiment, the D/A conversion unit 21 performs conversion into an analog amount (random number signal) and the amplification unit 22 amplifies the signal with a gain preliminarily adjusted, without using the random number bit value, which is generated by the random number generation unit 10, for the modulation of the period. This enables control of the amount of intentional fluctuation to be added to the period of the basic clock. Further, the random number signal thus amplified is supplied to the input side of the oscillation unit 27 (for example, the voltage control oscillator 27a) of the PLL circuit 23, thereby making it possible to add an intentional fluctuation using a pseudo-random number to the period of the basic clock CKf.

Figure 4:
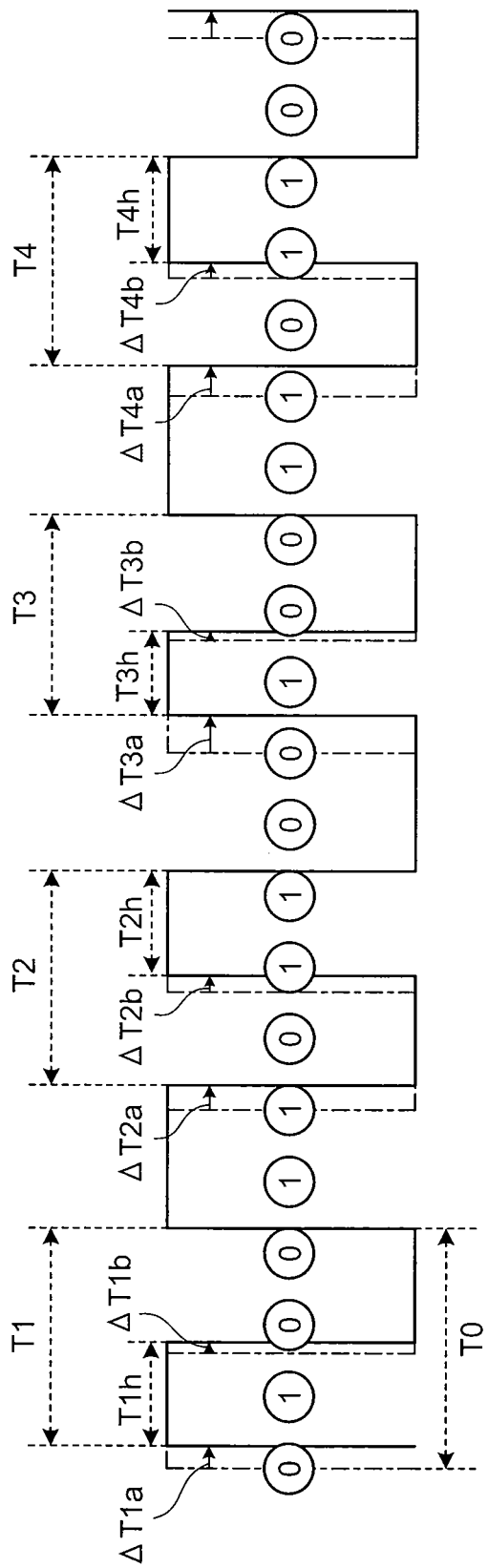
FIG. 4 is a diagram showing a writing operation of the information recording apparatus according to the first embodiment.

Thus, as shown in FIG. 4, half periods T1/2 to T4/2 of the modulated clock CKm used for writing can be dynamically changed, which contributes to a reduction in the number of periods where the magnetization reversal timing matches the position of the magnetic grain.

For example, periods T1 to T4 and high-level periods T1h to T4h of the modulated clock CKm have relations with the period T0 and the high-level period T0h of the basic clock CKf as expressed by the following Formulas 1 to 8. Accordingly, the periods T1 to T4 of the modulated clock CKm have relations as expressed by Formula 9, for example, and the high-level periods T1h to T4h have relations as expressed by Formula 10, for example.

$$T1=T0-\Delta T1a \qquad \text{Formula 1}$$

$$T2=T0-\Delta T2a \qquad \text{Formula 2}$$

$$T3=T0\times\Delta T3a \qquad \text{Formula 3}$$

$$T4=T0-\Delta T4a \qquad \text{Formula 4}$$

$$T1h=T0h-\Delta T1a+\Delta T1b \qquad \text{Formula 5}$$

$$T2h=T0h-\Delta T2a+\Delta T2b \qquad \text{Formula 6}$$

$$T3h=T0h-\Delta T3a+\Delta T3b \qquad \text{Formula 7}$$

$$T4h=T0h-\Delta T4a+\Delta T4b \qquad \text{Formula 8}$$

$$T1>T2>T4>T3 \qquad \text{Formula 9}$$

$$T1h>T2h>T4h>T3h \qquad \text{Formula 10}$$

Next, a reading method adapted for the data written by using the above write signal will be described. The employment of the reading method described below enables further improvement in signal quality, that is, improvement in the S/N ratio.

Figure 5:
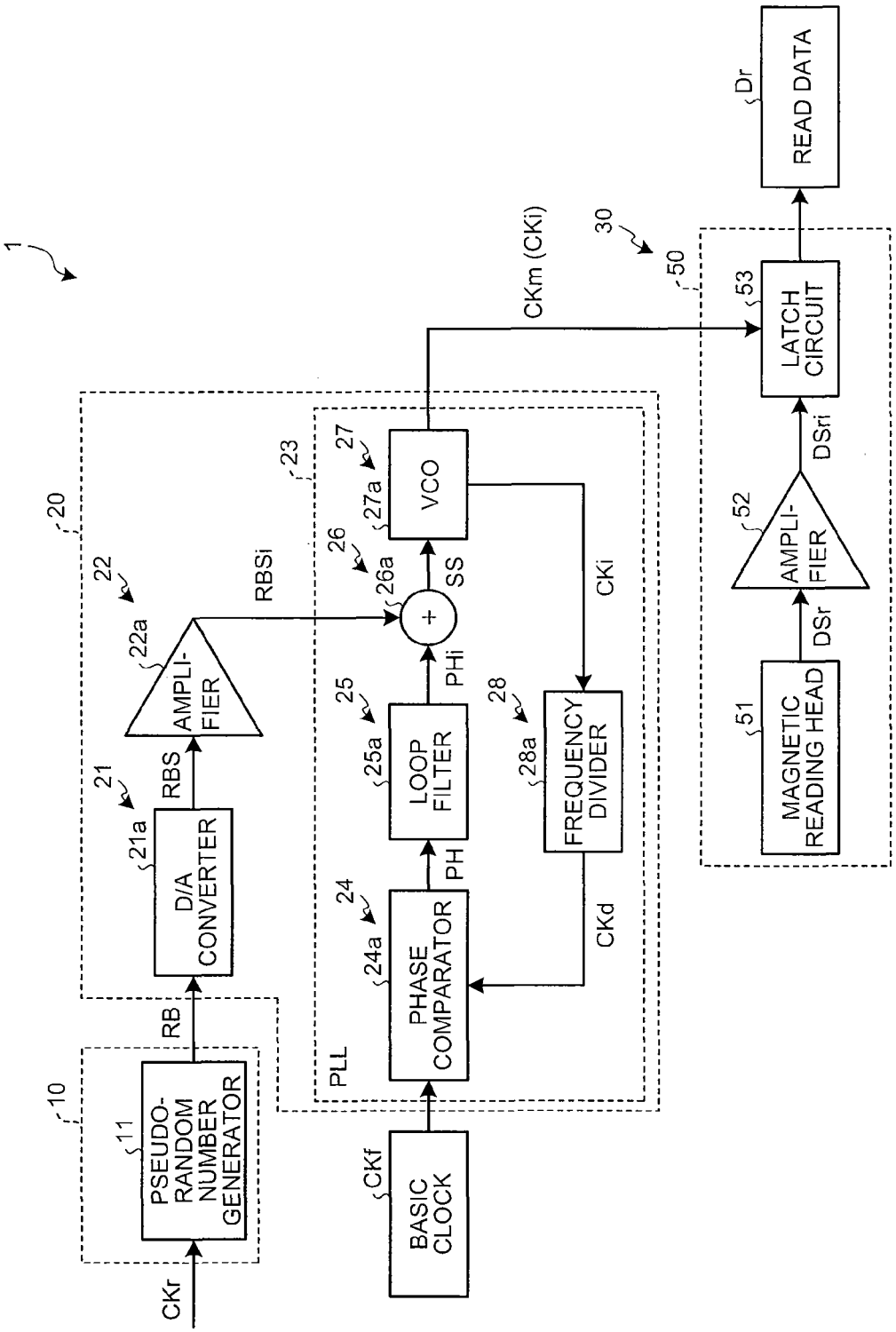
FIG. 5 is a diagram showing a configuration associated with reading of the information recording apparatus according to the first embodiment.

Specifically, as shown in FIG. 5, the processing unit 30 includes a reading unit 50. The reading unit 50 receives the modulated clock CKm from the oscillation unit 27 of the PLL circuit 23. The reading unit 50 reads the information, which is written on the magnetic recording medium 5 by the writing unit 40 (see FIG. 3), by using the modulated clock CKm. For example, the reading unit 50 includes a magnetic reading head 51 (see FIG. 1), an amplifier 52, and a latch circuit 53.

The magnetic reading head 51 reads the information written on the magnetic recording medium 5 by the magnetoresistance effect, and supplies the read signal to the amplifier 52 as a read signal DSr.

The amplifier 52 receives the read signal DSr from the magnetic reading head 51. The amplifier 52 amplifies the read signal DSr and supplies an amplified read signal DSri to the latch circuit 53.

The latch circuit 53 receives the modulated clock CKm from the oscillation unit 27 of the PLL circuit 23 and also receives the read signal DSri from the amplifier 52. The latch circuit 41 performs A/D conversion on the read signal DSri (analog signal) in synchronization with the modulated clock CKm, thereby generating (demodulating) read data Dr (analog signal). At the same time, the latch circuit 41 retrieves and holds the read data Dr (analog signal) in synchronization with the modulated clock CKm, and outputs the held read data Dr to the outside (for example, a controller).

At this time, reading sampling is carried out according to the modulated clock CKm supplied to the latch circuit 53. The modulated clock CKm is generated using a circuit similar to the circuit for generating the write signal shown in FIG. 3 (for example, using the same random number generation unit 10 and modulation unit 20, or different random number generation unit 10 and modulation unit 20 that perform a similar operation). Here, the random number seed of the random number generation unit 10 (for example, the pseudo-random number generator 11) is set to be equal to that used during writing, and the random number signal RBSi corresponding to the random number bit value RB generated by the random number generation unit 10 is added to the input side of the oscillation unit 27 in the PLL circuit 23. As a result, the period fluctuation applied during writing can be cancelled during reading. This effect will be described with reference to FIGS. 17 and 6.

Figure 17:
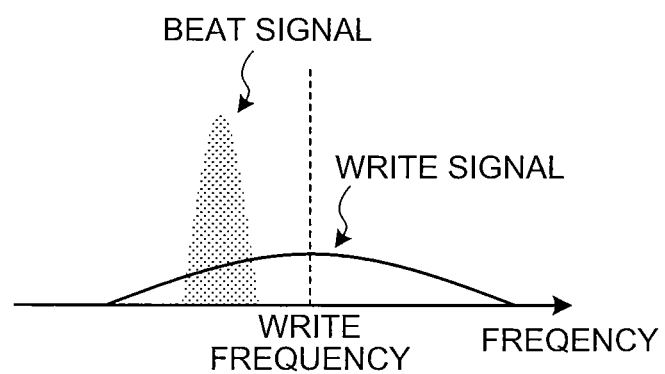
FIG. 17 is a diagram showing a comparative example.

As shown in FIG. 17, in the spectrum of the read data string obtained when the modulation of the period to the basic clock CKf during reading is not carried out, a peak of a beat signal which cannot be eliminated is observed in the beat period TB (see FIG. 13) corresponding to the least common multiple of the period of the basic clock CKf for reading and the space period of the magnetic grain in the reading direction. On the other hand, a write signal component is subjected to modulation with an intentional fluctuation to the period of the basic clock CKf during writing, so that the distribution of the write signal component is broadened. In short, as a result of adding an intentional fluctuation to the write signal to reduce the beat signal, the beat signal amplitude is reduced and the amplitude of the write signal component can be reduced as well, as compared to the write signal amplitude originally obtained.

Figure 6:
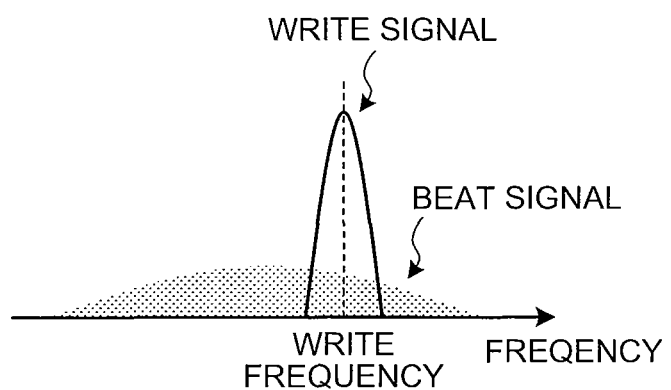
FIG. 6 is a diagram showing a reading operation of the information recording apparatus according to the first embodiment.

On the other hand, in the present embodiment, the modulation to the basic clock during reading is carried out using the pseudo-random number seed corresponding to that used during writing (for example, the same pseudo-random number seed). Accordingly, in the spectrum of the read data string, the write signal component can be sharpened and the beat signal component can be broadened as shown in FIG. 6. That is, the amplitude of the write signal component originally obtained is ensured and only the amplitude of the beat signal is reduced, thereby further improving the SNR (S/N ratio) of the read signal.

Next, a determination of the amount of modulation with respect to the period of the basic clock CKf will be described.

Assuming that the amount of intentional fluctuation to be added to modulate the period of the basic clock CKf is represented by $\sigma W$, the set value of $\sigma W$ is adjusted such that that the writing/reading SNR (S/N ratio) is equal to or greater than a predetermined threshold SNRth (for example, maximized).

Figure 7A:
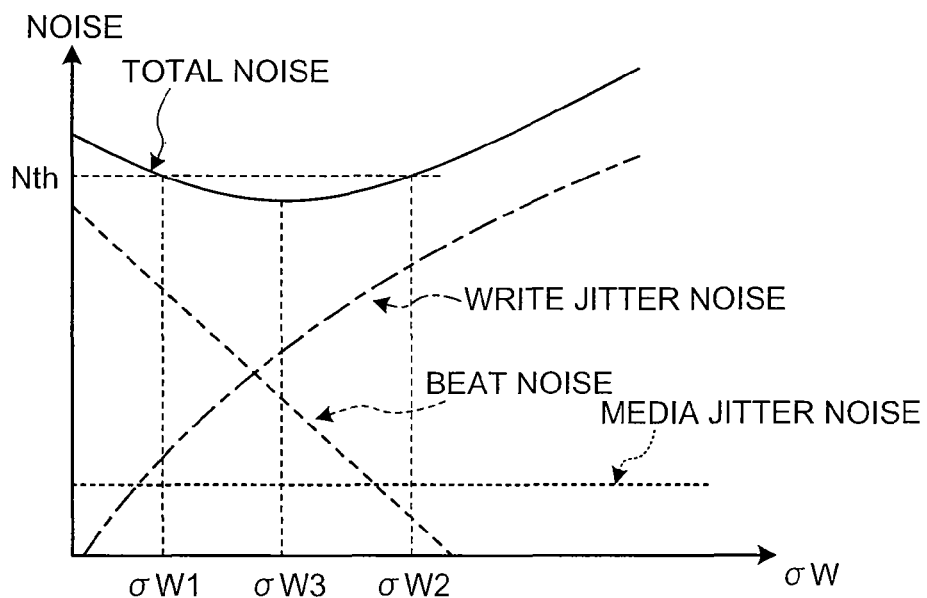
FIGS. 7A and 7B are diagrams each showing a method for determining a gain in the first embodiment.

FIG. 7A shows a conceptual diagram showing a change in amount of total noise due to the fluctuation amount $\sigma W$, assuming that the horizontal axis represents the fluctuation amount $\sigma W$ and the vertical axis represents the amount of noise. The amount of total noise is calculated by a square root of the sum of squares of jitter noise due to the write signal (write jitter noise), jitter noise due to media (media jitter noise), and noise due to beat (beat noise), for example. As the fluctuation amount $\sigma W$ is increased, the beat noise tends to decrease and the jitter noise due to the write signal tends to increase, while the jitter noise due to media is substantially the same. Note that in the case of modulating the period to the basic clock during reading according to the embodiment described above, the increase in jitter noise due to the write signal can be suppressed.

As shown in FIG. 7A, as the fluctuation amount $\sigma W$ is increased, the amount of total noise tends to decrease along with a decrease in beat noise. When the fluctuation amount $\sigma W$ is further increased, the amount of total noise tends to increase along with an increase in jitter noise due to writing. That is, the fluctuation amount $\sigma W$ has an appropriate range of $\sigma W1$ to $\sigma W2$ in which the amount of total noise is equal to or less than a threshold Nth. An optimum value $\sigma W3$ having a minimum amount of total noise is present in the appropriate range of $\sigma W1$ to $\sigma W2$.

Figure 7B:
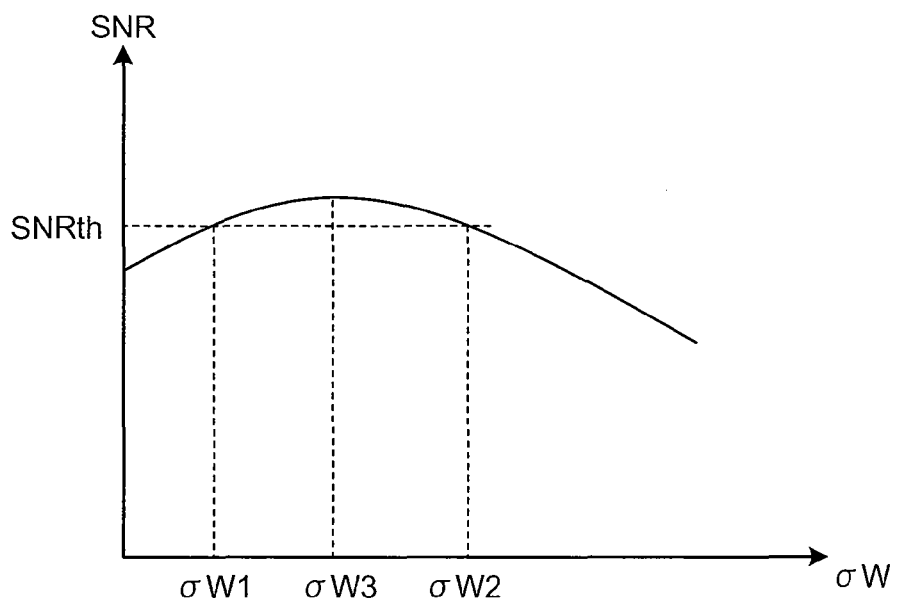

When the vertical axis of FIG. 7A is converted into the SNR (S/N ratio), a graph as shown in FIG. 7B is obtained. Specifically, as the fluctuation amount $\sigma W$ is increased, the S/N ratio tends to increase along with a decrease in beat noise. When the fluctuation amount $\sigma W$ is further increased, the S/N ratio tends to decrease along with an increase in jitter noise due to writing. That is, the fluctuation amount $\sigma W$ has the appropriate range of $\sigma W1$ to $\sigma W2$ in which the S/N ratio is equal to or greater than SNRth. The optimum value $\sigma W3$ having a maximum S/N ratio is present in the appropriate range of $\sigma W1$ to $\sigma W2$.

Accordingly, in the amplification unit 22 shown in FIGS. 3 and 5, a gain corresponding to the fluctuation amount $\sigma W$ of the appropriate range of $\sigma W1$ to $\sigma W2$ (for example, a gain corresponding to the fluctuation amount $\sigma W$ of the optimum value $\sigma W3$) is empirically determined and set in advance. This allows the amount of intentional fluctuation to be added to the period of the basic clock for writing and reading to be optimized for the improvement in the S/N ratio of the read signal.

Figure 12A:
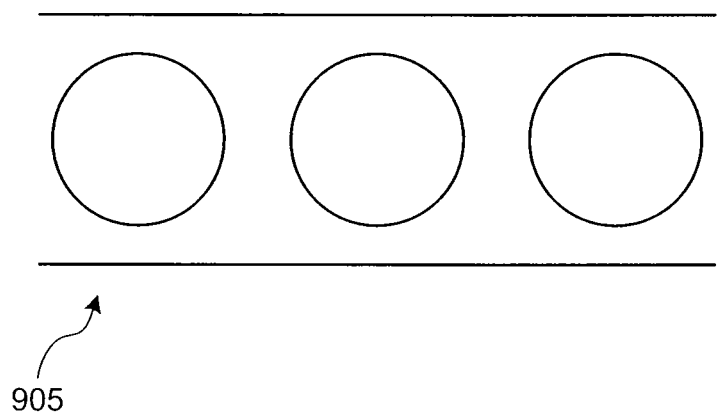
FIGS. 12A and 12B are diagrams each showing a comparative example.
Figure 12B:
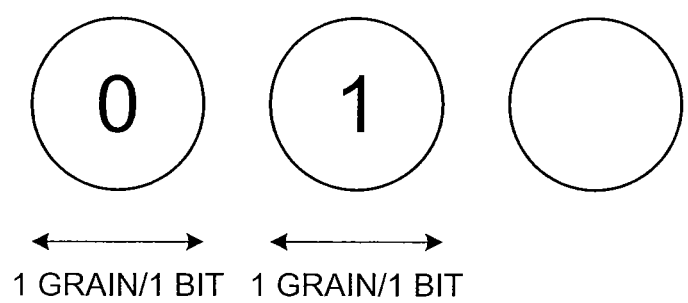

Here, assume a case where patterned media shown in FIGS. 12A and 12B are used as a magnetic recording medium 905 in which information is written by the information recording apparatus 1. In this case, a plurality of magnetic grains are regularly (for example, evenly) aligned in the magnetic recording medium 905, which contributes to reduction in disversion in position and size of the magnetic grains. However, the grain size of each magnetic grain is large (for example, about 20 nm), and the number of magnetic grains within one bit is limited to one. Further, each writing bit has a large size (for example, about 20 nm). Therefore, it is necessary to reduce the grain size in order to improve the areal recording density of the magnetic recording medium. Furthermore, it is also necessary to perform synchronous writing on each magnetic grain so that a single magnetic grain corresponds to one bit.

On the other hand, in the first embodiment, a plurality of fine magnetic grains (for example, 10 nm or less) are regularly (for example, evenly) aligned in the magnetic recording medium 5 in which information is to be written by the information recording apparatus 1. That is, the disversion in position and size of the magnetic grains can be reduced. In addition, the number of magnetic grains contained in one bit can be increased to two or more, while reducing the size of each writing bit. Consequently, the jitter noise can be easily reduced (see FIGS. 14 and 15). At the same time, the areal recording density of the magnetic recording medium can be easily improved.

Alternatively, assume a case where a plurality of magnetic grains are regularly (for example, evenly) aligned in the magnetic recording medium 5 in which information is to be written by the information recording apparatus 1 and no modulation is applied to the period of the basic clock CKf used for writing information. In this case, the write signal inversion timing matches the position of the magnetic grain with a period (hereinafter referred to as "beat period TB") corresponding to the least common multiple of the half period T0/2 of the basic clock CKf for writing and the space period TP of the magnetic grain in the reading direction. Further, magnetic grains which become unstable in the magnetization direction (hereinafter referred to as "recording unstable grains") are generated. In this case, as shown in FIG. 16, the beat noise generated with the beat period is predominant over jitter noise as the noise component. Accordingly, the total noise tends to increase and the S/N ratio tends to be difficult to be improved.

On the other hand, in the first embodiment, the random number generation unit 10 in the information recording apparatus 1 generates the random number bit value RB. The modulation unit 20 modulates the period of the basic clock CKf according to the random number bit value RB generated by the random number generation unit 10, thereby generating the modulated clock CKm. The processing unit 30 writes or reads information with respect to the magnetic recording medium 5 in synchronization with the modulated clock CKm generated by the modulation unit 20. For example, the writing unit 40 writes information corresponding to the write data Dw onto the magnetic recording medium 5 by using the modulated clock CKm. This contributes to reduction in the number of periods where the write signal inversion timing (magnetization reversal timing) matches the position of the magnetic grain, and reduction in the number of recording unstable grains which are unstable in the magnetization direction. Consequently, the total noise can be reduced and the S/N ratio can be easily improved.

More alternatively, assume a case where modulation of the period to the basic clock CKf during reading is not carried out. In this case, as shown in FIG. 17, in the spectrum of the read data string, a peak of a beat signal that cannot be eliminated is observed with the beat period TB (see FIG. 13) corresponding to the least common multiple of the period of the basic clock CKf for reading and the space period of the magnetic grain in the reading direction. On the other hand, the write signal component is subjected to modulation with an intentional fluctuation to the period of the basic clock CKf during writing, so that the distribution of the write signal component is broadened. That is, since the amplitude of the write signal component is smaller than the amplitude of the write signal component originally obtained, the improvement in the S/N ratio due to the reduction in beat noise is suppressed.

On the other hand, in the first embodiment, the reading unit 50 of the processing unit 30 reads the information, which is written on the magnetic recording medium 5 by the writing unit 40, by using the modulated clock CKm. That is, the modulation to the basic clock during reading is carried out using the pseudo-random number seed corresponding to that used during writing (for example, the same pseudo-random number seed). Accordingly, in the spectrum of the read data string, the write signal component can be sharpened and the beat signal component can be broadened (see FIG. 6). That is, the amplitude of the write signal component originally obtained is ensured and only the amplitude of the beat signal is reduced, thereby further improving the SNR (S/N ratio) of the read signal.

According to the first embodiment, in the modulation unit 20, the D/A conversion unit 21 converts the random number bit value RB generated by the random number generation unit 10, thereby generating the random number signal RBS. The amplification unit 22 amplifies the random number signal RBS generated by the D/A conversion unit 21. The PLL circuit 23 modulates the period of the basic clock CKf according to the random number signal RBSi amplified by the amplification unit 22, thereby generating the modulated clock CKm. As a result, the amount of intentional fluctuation (the degree of modulation) to be added to the period of the basic clock CKf by the modulation unit 20 can be controlled in an analog manner by setting the gain of the amplification unit 22.

Further, according to the first embodiment, in the modulation unit 20, the phase comparison unit 24 compares the phase of the basic clock CKf with the phase of the frequency-divided clock CKd, and outputs the phase error signal PH according to the comparison result. The synthesizing unit 26 synthesizes the phase error signal PHi with the amplified random number signal RBSi to generate the synthesized signal SS. The oscillation unit 27 oscillates at a frequency according to the generated synthesized signal SS to generate the internal clock CKi, and output the internal clock CKi as the modulated clock CKm. The frequency division unit 28 divides the frequency of the internal clock CKi, thereby generating the frequency-divided clock CKd. Thus, a modulation corresponding to the random number bit value RB can be applied to the period of the basic clock CKf.

Furthermore, according to the first embodiment, for example, the adder 26a of the synthesizing unit 26 adds the phase error signal PHi and the amplified random number signal RBSi, and outputs the addition result as the synthesized signal SS. This enables synthesis of the phase error signal PHi and the random number signal RBSi with a simple configuration.

Moreover, according to the first embodiment, the amplification unit 22 amplifies the random number signal RBS, which is generated by the D/A conversion unit 21, with a gain preliminarily determined such that the noise component contained in the read signal becomes an appropriate level. For example, the amplification unit 22 performs the amplification with the gain preliminarily determined such that the intentional fluctuation amount σW falls within the appropriate range of σW1 to σW2. Alternatively, for example, the amplification unit 22 performs the amplification with the gain preliminarily determined such that the intentional fluctuation amount σW is set to the optimum value σW3. This allows the amount of intentional fluctuation to be added to the period of the basic clock for writing and reading to be optimized for the improvement in the S/N ratio of the read signal.

Second Embodiment

Next, an information recording apparatus 100 according to a second embodiment will be described. Hereinafter, differences from the first embodiment will be mainly described.

In the circuit according to the first embodiment, a fluctuation is applied to the period of the basic clock CKf by including the random number signal in an input signal (for example, input voltage) of the oscillation unit 27 (for example, the voltage control oscillator 27a) within the PLL circuit 23. In this case, however, there is a possibility that the phase synchronous loop of the PLL circuit 23 becomes unstable. In view of the above, according to the second embodiment, the operation for applying a fluctuation to the period of the basic clock CKf is carried out outside a PLL circuit 123.

Figure 8:
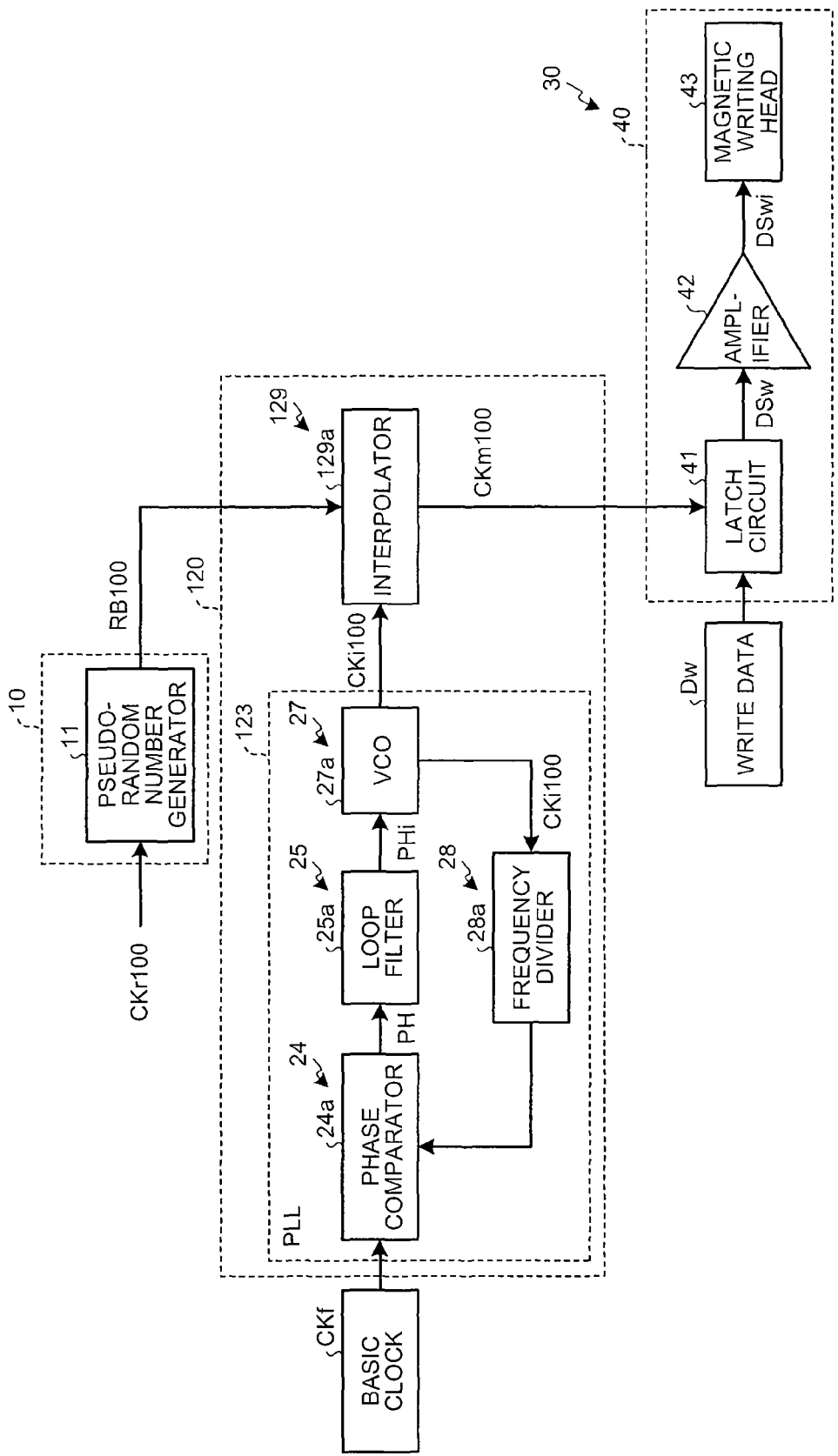
FIG. 8 is a diagram showing a configuration associated with writing of an information recording apparatus according to a second embodiment.
Figure 11:
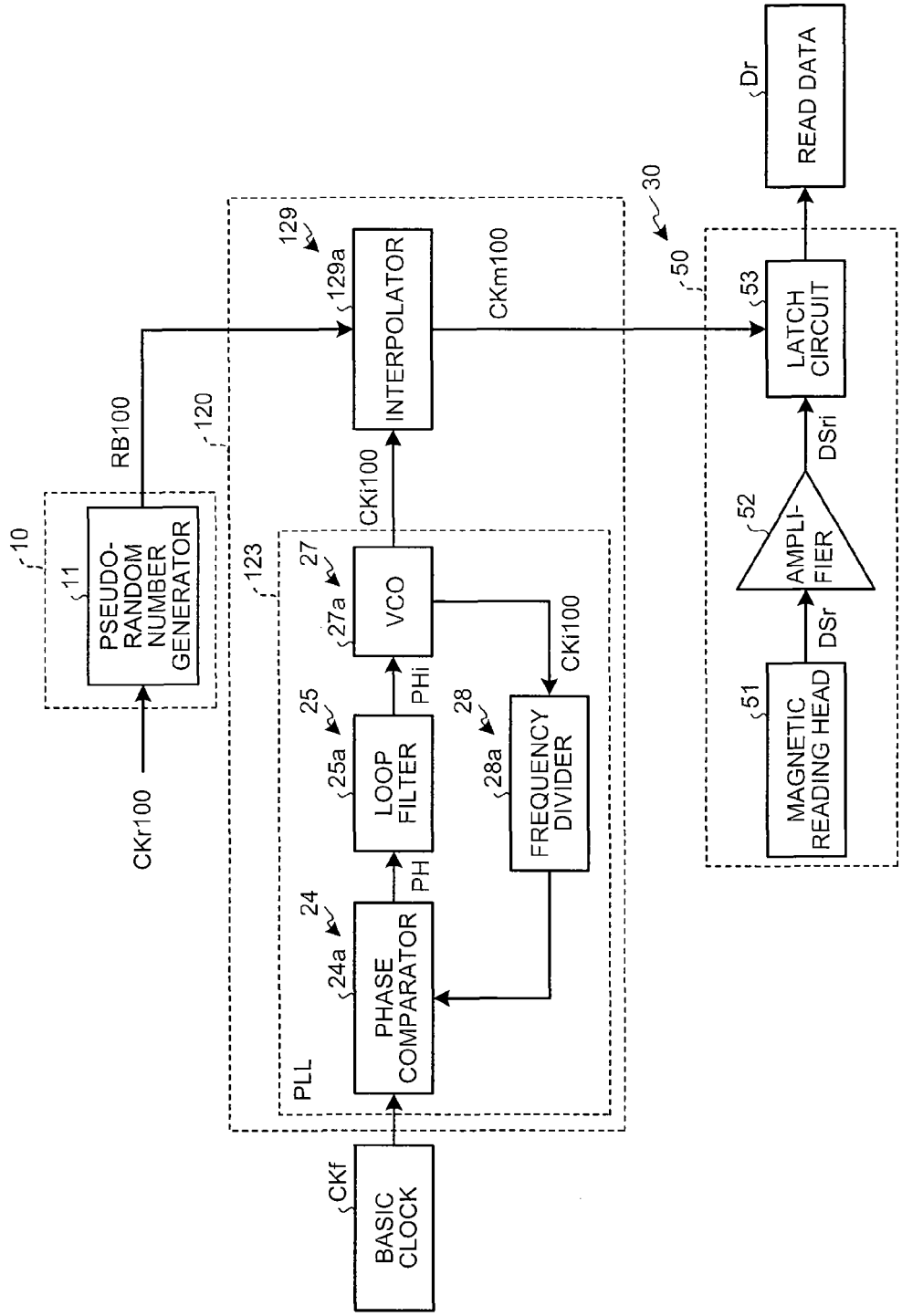
FIG. 11 is a diagram showing a configuration associated with reading of the information recording apparatus according to the second embodiment.

Specifically, as shown in FIGS. 8 and 11, in a modulation unit 120 of the information recording apparatus 100, the PLL circuit 123 does not include the synthesizing unit 26. Instead, an adjustment unit 129 is added on the output side of the PLL circuit 123.

The adjustment unit 129 receives a random number bit value RB100 from the random number generation unit 10 and also receives an internal clock CKi100 from the oscillation unit 27 of the PLL circuit 123. The adjustment unit 129 includes an interpolator 129a, for example, and dynamically adjusts the period of the internal clock CKi100 according to the random number bit value RB100 by using the interpolator 129a. The adjustment unit 129 outputs the adjusted signal to the writing unit 40 as a modulated clock CKm100. Further, the adjustment unit 129 outputs the adjusted signal to the reading unit 50 as the modulated clock CKm100.

Figure 9:
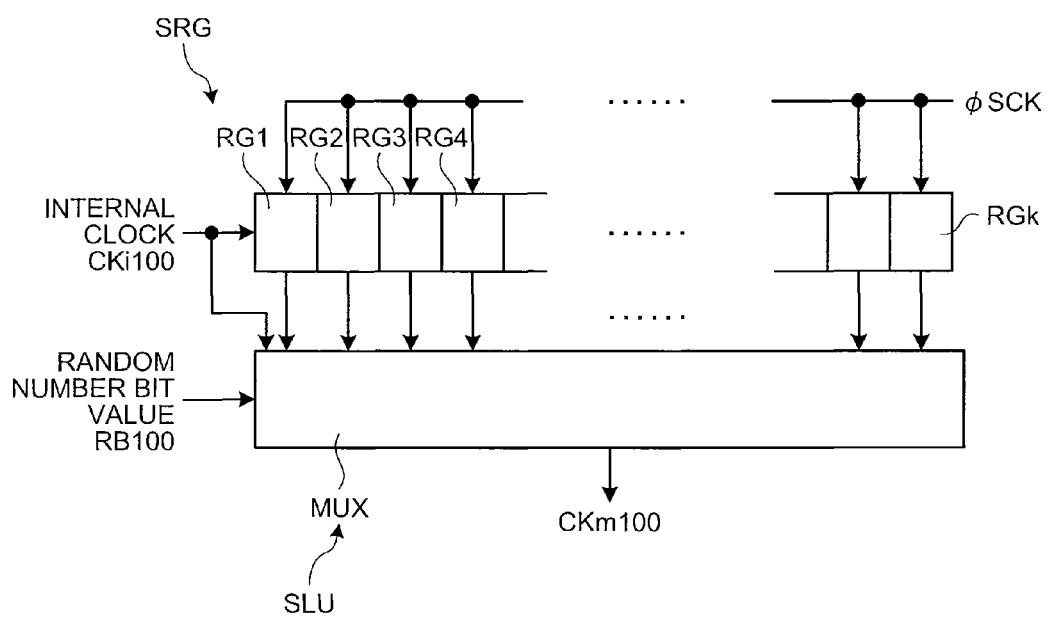
FIG. 9 is a diagram showing a configuration of an interpolator according to the second embodiment.

The interpolator 129a enables application of a delay according to the random number bit value RB100 to the input internal clock CKi100, and conceptually includes a shift register SRG and a selection unit SLU as shown in FIG. 9.

In the shift register SRG, a plurality of registers RG1 to RGk are connected in series. The shift register SRG receives the internal clock CKi100 from the oscillation unit 27 of the PLL circuit 123. For example, the shift register SRG sequentially shifts the internal lock CKi100 among the respective registers RG1 to RGk in synchronization with a clock φSCK. Accordingly, the respective registers RG1 to RGk generate clocks having different delay amounts with respect to the internal clock CKi100.

The selection unit SLU receives the random number bit value RB100 from the random number generation unit 10, and receives the internal clock CKi100 from the oscillation unit 27 of the PLL circuit 123. The selection unit SLU also receives the clocks, which are generated by the respective registers RG1 to RGk, from the respective registers RG1 to RGk. The selection unit SLU includes a multiplexer MUX, for example. The selection unit SLU selects one of the plurality of registers RG1 to RGk to be dynamically switched according to the random number bit value RB100 by using the multiplexer MUX, and outputs the clock generated in the selected register as the modulated clock CKm. In other words, the selection unit SLU selects as to output of which register is to be used as the modulated clock CKm100. For example, when the number of the registers RG1 to RGk is k=2048, the period of the basic clock CKf can be modulated while being changed with +1/4096 to +2048/4096 periods in 1/4096 period steps.

At this time, the random number generation unit 10 generates different random number bit value RB100 in synchronization with the random number generation clock CKr100 which is asynchronous with the basic clock CKf and has a frequency higher than that of the basic clock CKf. In other words, the random number bit value RB100 generated by the random number generation unit 10 is changed with a period which is asynchronous with the basic clock CKf and is shorter than that of the basic clock CKf.

Figure 10:
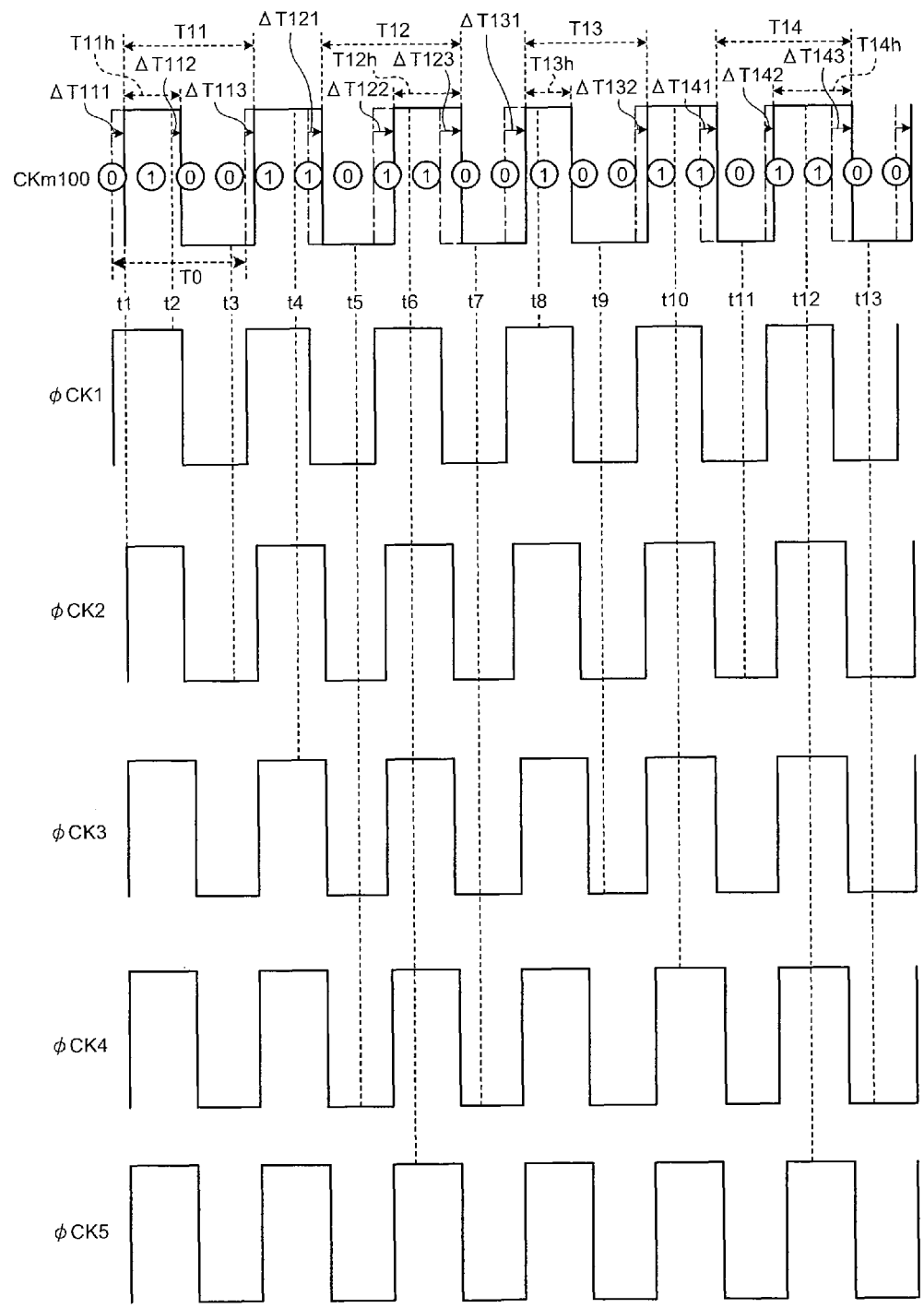
FIG. 10 is a diagram showing a writing operation of the information recording apparatus according to the second embodiment.

Accordingly, as shown in FIG. 10, the selection unit SLU dynamically switches one of the plurality of registers RG1 to RGk to be selected in synchronization with the change of the generated random number bit value RB100 (for example, in synchronization with each of timings t1 to t13). As a result, the selection unit SLU dynamically switches the clock to be selected from among a plurality of clocks φCK1 to φCKk generated in the plurality of registers RG1 to RGk, and employs the clock as the modulated clock CKm100, thereby enabling dynamic change of the period and the duty ratio of the modulated clock CKm used for writing.

For example, periods T11 to T14 and high-level periods T11h to T14h of the modulated clock CKm have relations with the period T0 and the high-level period T0h of the basic clock CKf as expressed by the following Formulas 11 to 18. Accordingly, the periods T11 to T14 of the modulated clock CKm have relations as expressed by Formula 19, for example, and the high-level periods T11h to T14h have relations as expressed by Formula 20, for example.

$T11 = T0 - \Delta T111 + \Delta T113$  Formula 11

$T12 = T0 - \Delta T121 + \Delta T123$  Formula 12

$T13 = T0 - \Delta T131 + \Delta T132$  Formula 13

$T14 = T0 - \Delta T141 + \Delta T143$  Formula 14

$T11h = T0h - \Delta T111 + \Delta T112$  Formula 15

$T12h = T0h - \Delta T122 + \Delta T123$  Formula 16

$T13h = T0h - \Delta T131$  Formula 17

$T14h = T0h - \Delta T142 + \Delta T143$  Formula 18

$T14 > T12 > T11 > T13$  Formula 19

$T14h > T12h > T11h > T13h$  Formula 20

In this manner, when the random number bit value RB100 generated by the random number generation unit 10 is input to the interpolator 129a, an intentional fluctuation using a pseudo-random number can be added to the period of the basic clock CKf and the period can be input to the latch circuit 41 of the writing unit 40. As a result, the number of periods where the magnetization reversal timing matches the position of the magnetic grain can be reduced as described above.

Further, when the random number bit value RB100 generated by the random number generation unit 10 is input to the interpolator 129a, an intentional fluctuation using a pseudo-random number can be added to the period of the basic clock CKf and the period can be input to the latch circuit 53 of the reading unit 50. At this time, the pseudo-random number seed of the random number generation unit 10 (for example, the pseudo-random number generator 11) is set to correspond to that used during writing (for example, the same pseudo-random number seed); thereby the period fluctuation applied during writing can be cancelled during reading.

As described above, according to the second embodiment, the adjustment unit 129 dynamically adjusts the period of the internal clock CKi100 output from the oscillation unit 27 of the PLL circuit 123 according to the random number bit value RB100 generated by the random number generation unit 10, and outputs the adjusted signal as the modulated clock CKm100. This makes it possible to perform the operation for applying a fluctuation to the period of the basic clock CKf outside the PLL circuit 123. This results in stabilization of the phase synchronous loop of the PLL circuit 123 and reduction in the number of periods where the magnetization reversal timing matches the position of the magnetic grain.

Furthermore, according to the second embodiment, in the adjustment unit 129, the plurality of registers RG1 to RGk of the shift register SRG respectively generate the clocks φCK1 to φCKk having different delay amounts with respect to the internal clock CKi100 output from the oscillation unit 27. The selection unit SLU selects one of the plurality of registers RG1 to RGk to be dynamically switched according to the random number bit value RB100 generated by the random number generation unit 10, and outputs the clock generated in the selected register as the modulated clock CKm100. This enables dynamic adjustment of the period of the internal clock CKi100 according to the random number bit value RB100.

Moreover, according to the second embodiment, the random number generation unit 10 changes and generates the random number bit value RB100 in synchronization with the random number generation clock CKr100 which is asynchronous with the basic clock CKf and has a frequency higher than that of the basic clock CKf. The selection unit SLU dynamically switches one of the plurality of registers RG1 to RGk to be selected in synchronization with the change of the random number bit value RB100 generated by the random number generation unit 10. This enables dynamic adjustment of the period of the internal clock CKi100 according to the random number bit value RB100 and adjustment of the duty ratio of the internal clock CKi100 according to the random number bit value RB100. Consequently, the number of periods where the magnetization reversal timing matches the position of the magnetic grain can be reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information recording apparatus that writes information onto a magnetic recording medium including a plurality of fine magnetic grains, the information recording apparatus comprising:
    a random number generation unit that generates a random number bit value;
    a modulation unit that modulates a period of a basic clock according to the random number bit value generated, and generates a modulated clock; and
    a processing unit that writes or reads information with respect to the magnetic recording medium in synchronization with the modulated clock generated,
    wherein the modulation unit comprises:
        a digital-to-analog (D/A) conversion unit that performs D/A conversion on the random number bit value generated and generates a random number signal; and
        an amplification unit that amplifies the random number signal generated, and
    wherein the modulation unit modulates the period of the basic clock according to the amplified random number signal.

2. The information recording apparatus according to claim 1, wherein a maximum modulation amount of the basic clock is determined such that a noise component contained in a read signal becomes an appropriate level.

3. The information recording apparatus according to claim 1, wherein the modulation unit further comprises:
    a phase comparison unit that compares a phase of the basic clock with a phase of a frequency-divided clock, and outputs a phase error signal according to a comparison result;
    a synthesizing unit that synthesizes the phase error signal with the amplified random number signal, and generates a synthesized signal;
    an oscillation unit that oscillates at a frequency according to the synthesized signal generated, and generates an internal clock to be output as the modulated clock; and
    a frequency division unit that divides a frequency of the internal clock to generate the frequency-divided clock.

4. The information recording apparatus according to claim 3, wherein the synthesizing unit comprises an adder that adds the phase error signal and the random number signal amplified, and outputs an addition result as the synthesized signal.

5. The information recording apparatus according to claim 1, wherein the amplification unit modulates the generated random number signal with the period of the basic clock preliminarily determined such that a noise component contained in a read signal becomes an appropriate level, and amplifies the modulated clock to an amount of modulation to be generated with a gain.

6. The information recording apparatus according to claim 1, wherein the processing unit comprises a writing unit that writes information onto the magnetic recording medium by using the modulated clock generated.

7. The information recording apparatus according to claim 1, wherein the processing unit comprises a reading unit that reads information written on the magnetic recording medium, by using the modulated clock generated.

8. The information recording apparatus according to claim 1, wherein the plurality of magnetic grains in the magnetic recording medium are regularly aligned, and each 1-bit information is written in two or more of the plurality of magnetic grains.

9. An information recording apparatus that writes information onto a magnetic recording medium including a plurality of fine magnetic grains, the information recording apparatus comprising:
    a random number generation unit that generates a random number bit value;
    a modulation unit that modulates a period of a basic clock according to the random number bit value generated, and generates a modulated clock; and
    a processing unit that writes or reads information with respect to the magnetic recording medium in synchronization with the modulated clock generated,
    wherein the modulation unit comprises:
    a phase comparison unit that compares a phase of the basic clock with a phase of a frequency-divided clock, and outputs a phase error signal according to a comparison result;
    an oscillation unit that oscillates at a frequency according to the phase error signal, and generates an internal clock;
    an adjustment unit that dynamically adjusts a period of the internal clock output from the oscillation unit according to the random number bit value generated, and outputs the adjusted signal as the modulated clock; and
    a frequency division unit that divides a frequency of the internal clock to generate the frequency-divided clock.

10. The information recording apparatus according to claim 9, wherein the adjustment unit comprises:
    a shift register including a plurality of registers connected in series to generate clocks having different delay amounts with respect to the internal clock; and
    a selection unit that selects one of the plurality of registers to be dynamically switched according to the random number bit value generated, and outputs a clock generated by the selected register as the modulated clock.

11. The information recording apparatus according to claim 10, wherein
    the random number generation unit changes and generates a random number bit value in synchronization with a random number generating clock, the random number generating clock being asynchronous with the basic clock and having a frequency higher than that of the basic clock, and the selection unit dynamically switches one of the plurality of registers in synchronization with a change of the random number bit value generated.

12. The information recording apparatus according to claim 9, wherein the plurality of magnetic grains in the magnetic recording medium are regularly aligned, and each 1-bit information is written in two or more of the plurality of magnetic grains.

13. An information writing method in an information recording apparatus that writes information onto a magnetic recording medium, the magnetic recording medium including a plurality of magnetic grains, the information writing method comprising:

generating a random number bit value;

modulating a period of a basic clock according to the random number bit value generated and generating a modulated clock; and processing information with respect to the magnetic recording medium in synchronization with the modulated clock generated, wherein the modulating comprises:

performing digital-to-analog (D/A) conversion on the random number bit value generated and generating a random number signal, amplifying the random number signal generated, and modulating the period of the basic clock according to the amplified random number signal.

14. The information writing method according to claim 13, wherein the modulating further comprises:

comparing a phase of the basic clock with a phase of a frequency-divided clock, and outputting a phase error signal according to a comparison result;

synthesizing the phase error signal with the amplified random number signal to generate a synthesized signal;

oscillating at a frequency according to the synthesized signal generated and generating an internal clock to be output as the modulated clock; and dividing the frequency of the internal clock to generate the frequency-divided clock.

15. The information writing method according to claim 14, wherein the synthesizing comprises adding the phase error signal and the random number signal amplified and obtaining an addition result as the synthesized signal.

16. The information writing method according to claim 13, wherein the amplifying comprises modulating the generated random number signal with a period of the basic clock preliminarily determined such that a noise component contained in a read signal becomes an appropriate level, and amplifying the modulated clock to an amount of modulation to be generated with a gain.

17. The information writing method according to claim 13, wherein a maximum modulation amount of the basic clock is determined such that a noise component contained in a read signal becomes an appropriate level.

18. The information writing method according to claim 13, wherein the processing comprises writing information onto the magnetic recording medium by using the modulated clock generated.

19. The information writing method according to claim 13, wherein the processing comprises reading information written on the magnetic recording medium, by using the modulated clock generated.

20. The information writing method according to claim 13, wherein the plurality of magnetic grains in the magnetic recording medium are regularly aligned, and each 1-bit information is written in two or more of the plurality of magnetic grains.

* * * * *